Feb. 2, 1960 E. V. BERGSTROM 2,923,677
METHOD AND APPARATUS FOR THE SUPPLY OF HYDROCARBON
CHARGE TO CONVERSION REACTORS
Filed Sept. 18, 1958 4 Sheets-Sheet 1

INVENTOR
Eric V. Bergstrom
BY
Andrew L. Gabouriault
AGENT

INVENTOR
Eric V. Bergstrom
BY
Andrew L. Jaboriault
AGENT

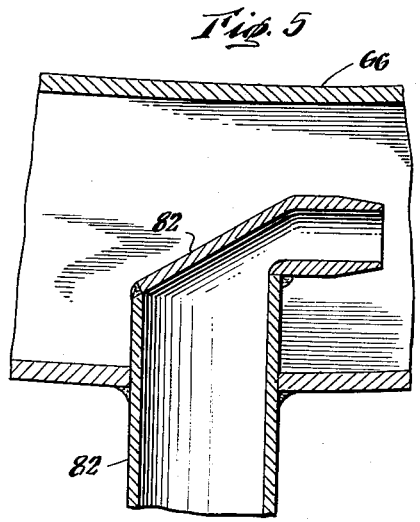
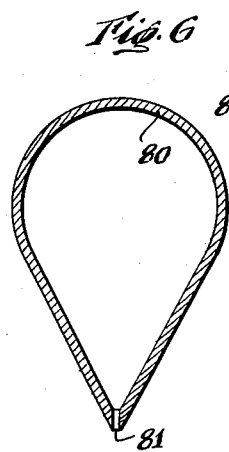
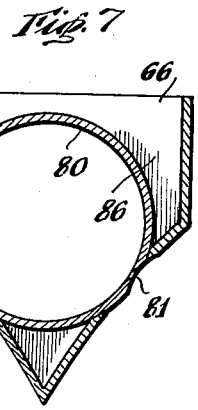
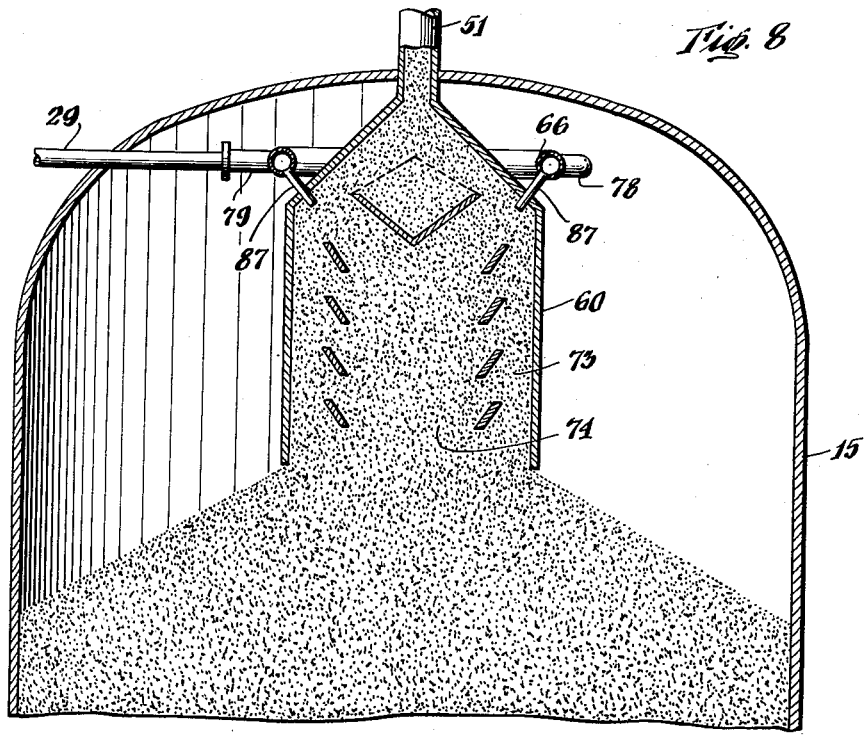

United States Patent Office 2,923,677
Patented Feb. 2, 1960

2,923,677

METHOD AND APPARATUS FOR THE SUPPLY OF HYDROCARBON CHARGE TO CONVERSION REACTORS

Eric V. Bergstrom, Byram, Conn., assignor to Socony Mobil Oil Company, Inc., a corporation of New York Application September 18, 1958, Serial No. 761,823

8 Claims. (Cl. 208—48)

This application is a continuation-in-part of application Serial Number 353,745, filed May 8, 1953, now abandoned.

This invention has to do with a method and apparatus for the conversion of fluid hydrocarbons in the presence of a bed of solid contact material particles. Particularly, this invention deals with a method and apparatus for the supply of hydrocarbon charge, at least partially in the liquid phase, to such a bed.

Typical of the processes to which this invention applies is the catalytic conversion of high boiling fluid hydrocarbons to lower boiling gasoline-containing hydrocarbons by passing the hydrocarbon charge through a moving mass of granular catalyst particles at temperatures of 850° F. and upwards. Other exemplary processes include the catalytic dehydrogenation, polymerization, isomerization, alkylation, and the like, of liquid or mixed phase hydrocarbons using a bed of adsorbent catalytic solids, either as a moving compact mass, a fixed bed or a fluidized bed, and the thermal coking, cracking, visbreaking, and the like, of liquid or mixed phase hydrocarbons in the presence of an inert contact material.

In such processes wherein the contact material is catalytic in nature, it may partake of the nature of natural or treated clays, bauxite, activated alumina, or synthetic associations of silica, alumina or magnesia or combinations thereof, to which certain metallic oxides may be added in small amounts for specific purposes. When the contact material is inert in character, it may partake of the nature of refractory materials, such as zirkite, corhart or mullite, or particles of quartz or fused alumina or coke, or it may partake of the nature of stones or metallic particles or balls. When the contact material is used in the moving mass type process or in a fixed bed type process, it should generally be within the size range 1 inch to 100 mesh, and preferably 4 to 20 mesh by Tyler standard screen analysis. When the contact material is used in the fluidized bed type process, it preferably falls within the size range 100 to 400 mesh by Tyler standard screen analysis.

In processes of the aforementioned types, it is generally necessary to introduce the hydrocarbon charge at a temperature substantially below the desired optimum conversion temperature. This is required because the optimum conversion temperature is normally above the temperature at which the hydrocarbon charge undergoes substantial thermal decomposition. Such decomposition in the charge preheater or in any part of the transfer system before entry into the reaction chamber is obviously undesirable. It becomes necessary, therefore, to provide the heat required to raise the hydrocarbon charge to the optimum conversion temperature from the temperature to which it can be conveniently heated without thermal conversion, as well as any heat required by the conversion reaction itself, by some means within the reaction zone or chamber. The most convenient and economical means for accomplishing this is to introduce the contact material to the reaction zone at a temperature sufficiently above the optimum conversion temperature to provide this required heat. This results, of course, in the reaction zone at the level of charge supply being operated at a temperature substantially above the pyrolytic conversion temperature of the hydrocarbon charge. As a result, any metal parts which carry liquid and lie within the reaction zone or chamber may exist at a temperature substantially above the pyrolytic conversion temperature of the charge and, thus, coke may form thereon and either plug up the supply apparatus or accumulate on the outside thereof to break off in large pieces which may plug up restricted passages in the lower section of the reactor and elsewhere in the system. This coke formation is particularly pronounced where the hydrocarbon charge is, in part or entirely, in the liquid phase. One recently suggested method for avoiding coke formation on the walls of the reaction chamber is to embed the liquid supply apparatus within the contact material bed. This effectively shields the walls of the reactor from the liquid. Any liquid-carrying apparatus so embedded, however, is subject to the high temperature of the surrounding contact material bed. This high temperature may cause coking within the liquid feed apparatus, which will result in its plugging up after only a short period of operation, unless some means is provided to maintain the liquid therein below the thermal conversion temperature.

A major object of this invention is to provide a method and apparatus for supplying hydrocarbon charge to a reaction zone in a manner which overcomes the above described difficulties.

Another object of this invention is to provide a method and apparatus for supplying a hydrocarbon charge, at least partially in the liquid phase, to a reaction zone wherein there is maintained a bed of solid contact material particles.

Another object of this invention is to provide, in a system for the conversion of fluid hydrocarbons by passage through a moving bed of solid contact material particles, a method and apparatus for supplying hydrocarbon charge, at least partially in the liquid phase, to the contact material bed which avoids rapid coke formation within the liquid supply apparatus.

These and other objects of the invention will be apparent from the following discussion.

This invention involves supplying the hydrocarbon charge, at least partially in the liquid phase, to an annular-shaped liquid manifold maintained within the confined reaction zone or chamber as at least one high velocity jet or stream of hydrocarbon charge directed in a manner which will induce circulation of a stream of hydrocarbon charge around the continuous passage. A part of the hydrocarbon charge so circulating is passed from the continuous passage into the reaction zone proper through a plurality of restricted passages which offer a substantial resistance to flow. The remainder of the charge is circulated around to combine again with the jet of charge being continuously introduced.

The terms "annular," "annular-shaped," and the like, refer to a passage or member of the shape of the space defined between two members of the same or different shapes but of different cross-sectional areas, one being placed symmetrically within the other, regardless of whether such space is ring-shaped or not. The term "gaseous" is used herein to refer to a material in the gaseous phase under the existing conditions of temperature and pressure, regardless of what may be the normal state of the material under normal atmospheric conditions.

This invention will be best understood by referring to the attached drawings, of which Figure 1 is a highly diagrammatic elevational view of one form of charge preparation system which might be used to supply hydrocarbon charge to a conversion reactor in the manner of this invention;

Figure 5 is a sectional view of one type of supply nozzle that may be used in conjunction with the supply manifold in this invention;

Figure 6 is a vertical sectional view through one type of manifold that may be used in this invention;

Figure 7 is a vertical sectional view through another type of manifold that may be used in this invention; and Figure 8 is an elevational view, partially in section, of a hydrocarbon reactor employing a modified form of this invention.

All of these figures are diagrammatic in form and like parts in all bear like numerals.

Figure 1:
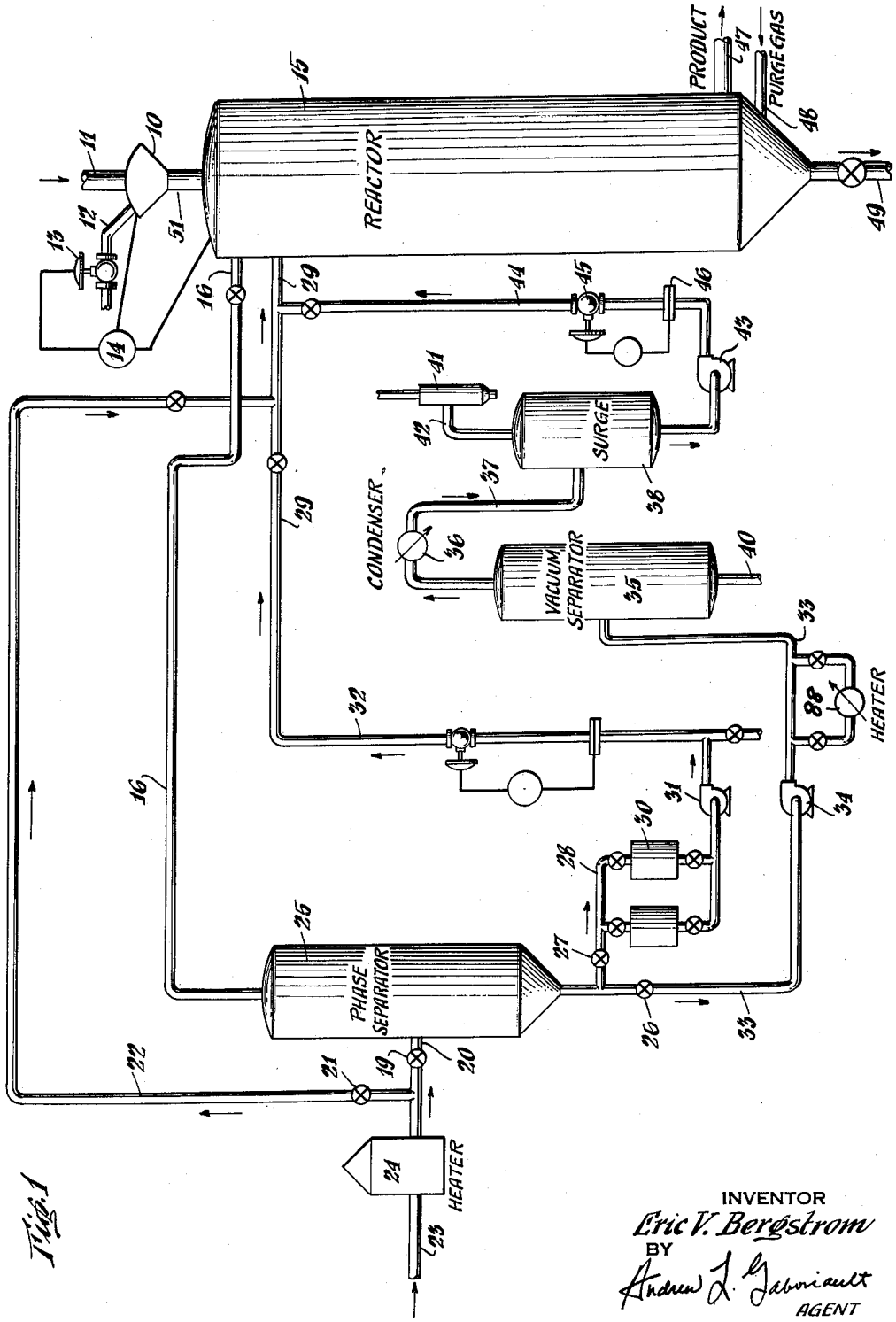

Turning now to Figure 1, there is shown therein a hydrocarbon conversion reactor 15 with a seal chamber 10 positioned thereabove. As an example, the operations in Figure 1 will be described in connection with a catalytic conversion process of the moving mass type. It should be understood, however, that the invention is equally applicable to many other types of conversion processes as previously stated. A granular catalyst which may be, for example, a synthetic silica-alumina catalyst, gravitates into seal chamber 10 through passage 11. The catalyst at this point will typically be at a temperature of about 1030° F.

A pressure of inert seal gas is maintained within seal chamber 10 slightly above the pressure within the upper section of reactor 15 by admitting seal gas to the seal chamber through passage 12 at rates controlled by diaphragm valve 13 in response to differential pressure controller 14. Catalyst gravitates downwardly through the reaction zone within reactor 15 as a substantially compact bed.

A hydrocarbon charge apparatus of the type described hereinbelow is maintained within the upper section of this moving bed. Hydrocarbon charge may be supplied to this charge apparatus and then to the reaction bed in any one of several ways. Where the hydrocarbon charge is substantially free of tarry or asphaltic materials, it may be advantageous to supply the charge to the reaction bed through the apparatus of this invention as a mixed phase feed. To accomplish this, the charge is passed into the system through conduit 23 and is heated in heater 24. Valve 19 on line 20 is closed, while valve 21 on line 22 is open. Charge is heated to a temperature of about 750° F. and then passed through passage 22 into passage 29 and then into the charging operation within reactor 15. The hydrocarbon charge is supplied to the charging apparatus partially as a liquid and partially as a vapor.

In some situations it may be preferred, where the hydrocarbon charge is substantially tar-free, to supply the charge to the reactor as separate streams of liquid and vapor. This may be accomplished by passing the heated charge from heater 24 through conduit 20 into a phase separator 25. In the phase separator the vaporizable portion of the charge flashes off and passes through conduit 16 into reactor 15. This vapor may typically be at a temperature of about 800° F. Beneath the phase separator, valve 26 is closed while valve 27 remains open. The liquid portion of the charge is removed from the bottom of the separator and passed through passage 28 and then through strainer 30, wherein any suspended matter may be removed. The liquid charge is then pumped by means of pump 31 through passages 32 and 29 into the charging apparatus within reactor 15. The liquid charge might typically be supplied to the charging apparatus at a temperature of about 700° F.

Where the hydrocarbon charge contains some tarry or asphaltic material, another mode of operation is desirable. The heated charge is passed to phase separator 25 through passage 20 and the vapor fraction flashes off as before to be charged to the reactor through conduit 16. The liquid portion containing tar is pumped from the lower section of the phase separator through passage 33 by means of pump 34 and supplied to a vacuum separator 35. The liquid fraction may be heated by passage through heater 88, if desired, within the vacuum separator 35. A pressure of about one pound per square inch might typically be maintained within separator 35. At this pressure hydrocarbons, suitable to form the liquid charge, vaporize and pass overhead. These hydrocarbons are condensed by a condenser 36 and pass into a surge tank 38 through passage 37. The tar is removed as a liquid from the bottom of vacuum separator 35 through passage 40. An ejector 41 connects into the upper section of surge tank 38 through passage 42 to maintain the desired reduced pressure within the surge tank and the vacuum separator. The liquid charge is pumped from the bottom of the surge tank by means of pump 43 and passed through conduits 44 and 29 into the charging apparatus within reactor 15. The liquid, as supplied to the charging apparatus, might typically be about 650° F. The rate of supply of liquid charge is controlled by means of valve 45 in response to flow rate controller 46.

The total hydrocarbon charge to a typical catalytic conversion reactor might be about 15,000 barrels per day. Of this amount, about eighty percent might be supplied as vapor. The catalyst circulation rate for this charge rate would be about 315 tons per hour.

Hydrocarbon charge passes downwardly through the reaction bed within reactor 15 and is converted to lower boiling products which may contain high percentages of gasoline and fuel oil. These products are removed through passage 47. The used catalyst bearing a carbonaceous contaminant is purged free of adhering hydrocarbons by means of a suitable inert urge gas admitted through conduit 48. Used catalyst is then removed from the reactor through conduit 49 and passed to a suitable catalyst regenerator (not shown) of any type well-known to the prior art.

Figure 2:
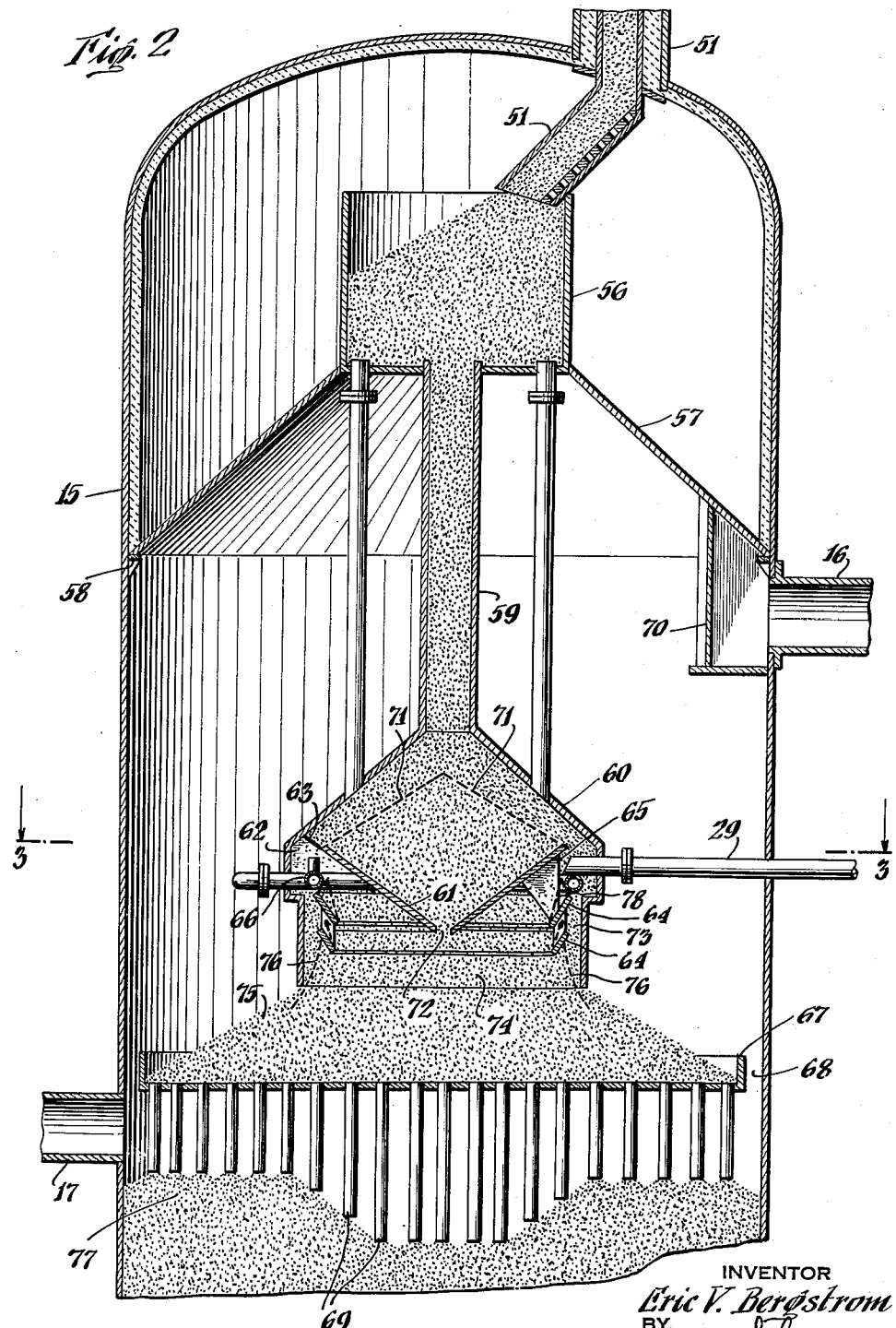
Figure 2 is an elevational view, in section, of the upper section of a conversion reactor utilizing one form of this invention.
Figure 3:
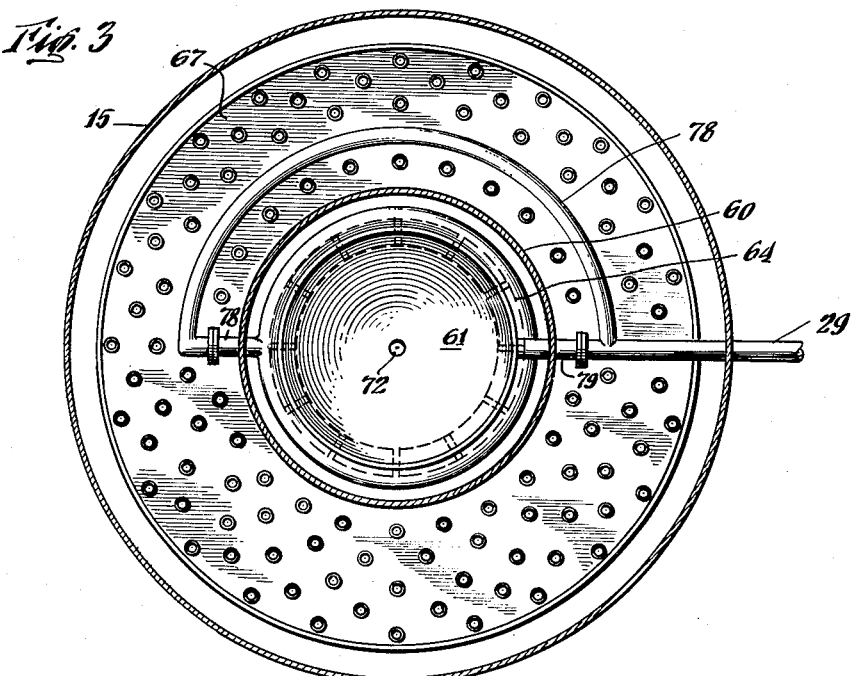
Figure 3 is a sectional view along line 3—3 of Figure 2.

Turning now to Figures 2 and 3, which are best considered together, there is shown therein the upper section of a hydrocarbon conversion reactor. Contact material enters the upper end of the reactor 15 through conduit 51 and is discharged into a centrally disposed receptacle 56. Extending outwardly from the lower end of receptacle 56 to the walls of vessel 15 is a downwardly-sloping, frusto-conical partition 57 which is supported on a support 58. Contact material gravitates from the bottom of receptacle 56 through vertical passage 59 into the space enclosed by hood 60.

Within the hood is provided a central baffle 61 in the shape of an inverted frustum of a cone. This baffle carries on its upper surface a substantially stagnant layer of contact material with upper end defined by lines 71. Some slight flow occurs through this stagnant layer through an opening 72 in the bottom of baffle 61. However, the major portion of contact material flow occurs around this stagnant layer and around baffle 61. Provided within the compact contact material column, within the lower section of hood 60, are hoop-shaped baffles 64. These baffles are so situated and shaped that the contact material within the column flows as two separate regions, a narrow peripheral high velocity region 73 and a central low velocity region 74. The approximate line of division between these regions is shown by flow pattern lines 76. The liquid or mixed phase hydrocarbon charge is injected only into the narrow high velocity region. Any vapors formed by vaporization or conversion of the liquid expand into the low velocity region 74. Contact material from both regions then passes into accumulation 75 within receptacle 67 and then passes downwardly onto reaction bed 77 through passages 69. This method of feeding the liquid into a high velocity contact material stream which carries a major portion of the contact material flow to the reaction bed proper and allowing vapors formed to expand into a lower velocity region is described and claimed in United States patent application Serial Number 633,623, filed January 11, 1957.

The liquid is supplied to high velocity region 73 from a supply ring manifold 66 embedded within the high velocity region, which is constructed and operated according to this invention as described in greater detail hereinbelow. Liquid charge enters both sides of the ring by splitting the flow from passage 29, so that a part passes around through a branch conduit 78 to enter one side of ring 66, while the remainder enters the opposite side through another branch conduit 79.

If it is desired to supply a separate stream of vaporized hydrocarbon charge, it may enter the reactor through conduit 16 and then pass downwardly through space 68, next to receptacle 67, and then into reaction bed 77 in the area between conduits 69. Conduits 69 are preferably spaced apart within a critical center-to-center limit, as described and claimed in United States Patent Number 2,846,370 to Halik et al. Likewise, in order to avoid a temperature gradient across reaction bed 77, due to only a portion of the contact material having been contacted with liquid charge and cooled thereby, the centermost of conduits 69 are made longer than the outermost of conduits 69 to provide for sufficient increased vapor flow through the centermost portion to correct for this difference in temperature. This development is described and claimed in United States Patent Number 2,808,367 to Bergstrom.

Figure 4:
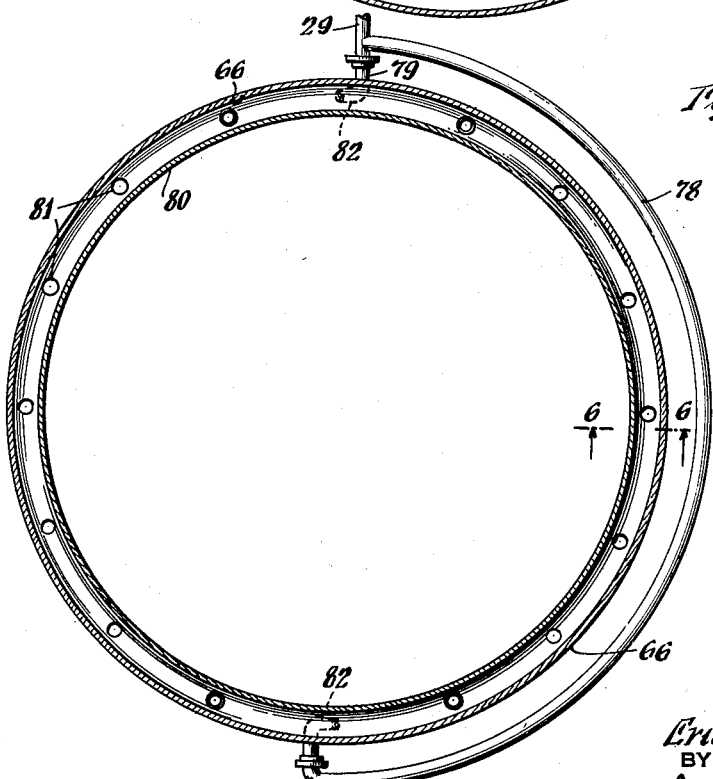
Figure 4 is a horizontal sectional view of one type of manifold which may be used in this invention.

Details of a continuous manifold 66, constructed according to this invention, are illustrated in Figures 4 and 5, which will be considered together. A horizontal sectional view through a preferred type of manifold is shown in Figure 4. The manifold consists of a circular pipe 80 with a plurality of spaced-apart orifices 81 through its underside. Conduits 78 and 79 extend into opposite sides of this ring. Attached to the outer end of each of these conduits is a nozzle 82, which is best illustrated in Figure 5. Each of these nozzles is directed down the axis of the pipe 80 in a manner which will induce flow of the hydrocarbon charge around the ring.

In operation, the liquid or mixed phase hydrocarbon charge passes into opposite sides of the ring 80 through passages 78 and 79 and then through nozzles 82. Liquid or mixed liquid and vapors issue from each of the nozzles as a high velocity stream or jet which causes continuous circulation around the manifold passage 80. A portion of the circulating charge stream passes into the contact material bed through flow-restricting passages or orifices 81, while the remainder of the charge recirculates around the ring to be mixed with fresh charge entering through nozzles 82. By this device of continuous circulation of the liquid, overheating of the liquid in the ring, due to heat transfer from the hot contact material bed in which the ring is embedded or due to heat transfer from any other hot atmosphere in which the ring is situated, is avoided. Charge hydrocarbons should be supplied to the ring through jets 82 at a sufficiently low temperature to avoid a substantial coke formation within the ring, as explained hereinbelow.

Figure 6 is a cross-sectional view of a preferred shape of manifold ring for embedding within a moving mass of contact material. This ring has an upper circular section with a lower section in the shape of an inverted cone with sides at an angle with the horizontal greater than the angle of repose of the contact material. This angle of repose will normally be within the range 25 to 45 degrees, and generally about 30 degrees. The angle of the bottom should preferably be greater than 40 degrees with the horizontal. Orifices 81 are provided along the bottom of the ring, through which liquid is injected into the contact material bed. With this shape of ring all the outside surfaces of the ring are scrubbed by contact material as it flows past. Thus, any coke which may form on the outside of the ring will be promptly removed by the abrasive action of the contact material before any deposit of a size sufficient to plug any of the restricted passageways in the system can build up.

Another favorable shape for the manifold is shown in Figure 7. The manifold there consists of an ordinary circular pipe 80 with orifices 81 through the underside thereof. The wall of the pipe is of reduced thickness around these orifices, so that if coke should form therein, it may be easily removed by burning or reaming out. Orifices 81 are at an angle with the horizontal at least equal to the angle of repose of the contact material, so that they are continuously scrubbed by flowing contact material. Around pipe 80 is a receptacle 85. This receptacle is of greater width than pipe 80, so that a space 86 is formed between pipe and receptacle. The bottom of the receptacle tapers downwardly at an angle with the horizontal greater than the angle of repose of the contact material. With this design, all outside walls of the manifold device are again scrubbed by flowing contact material when it is embedded in a compact moving bed of contact material. In addition, contact material flows over the outside of orifices 81. Also, contact material will collect in space 86 and remain there to form an insulating layer around most of pipe 80 which carries the liquid charge. This will help to maintain the liquid within pipe 80 below the temperature of rapid coking. The feature of providing a stagnant layer around the liquid carrying manifold pipe is the subject of claims described in United States patent application Serial Number 633,623, filed January 11, 1957. The provision of a manifold of a shape such that all outside surfaces thereof will be scrubbed by flowing contact material is, however, a part of this invention.

Figure 8 illustrates a hydrocarbon conversion system wherein the method of feeding the liquid or mixed phase charge is substantially the same as that of Figure 2. However, in Figure 8, manifold 66 is maintained outside of the contact material column within hood 60 and liquid is passed therefrom through pipes 87 into high velocity region 73. Liquid manifold in the system of Figure 8 is maintained in the reaction housing or vessel 15, however, although it is not embedded within the contact material bed.

By the method and apparatus of this invention, rapid coking of the hydrocarbon charge apparatus is avoided in a manner which is both economical and efficient. In the prior art, liquid or mixed phase charge was supplied to only one side of a manifold ring, as required, so that at the other end thereof the liquid was more or less stationary or stagnant so that it rapidly rose to the temperature of the surrounding reactor and coke was quickly formed therefrom. In addition, in the prior art systems, it was not possible to use mixed phase charge because, since there was little circulation around the manifold, a uniform mixture of vapor and liquid was not ejected from each of the passages from the ring. Thus, all vapor came out of some of the passages and all liquid out of others so that liquid and vapor were not uniformly distributed across the reaction bed.

The temperature of the oil within the manifold passage should be controlled below the level of rapid coking. The manifold temperature depends upon the temperature and the rate of supply of the oil thereto, and the rate and amount of the oil recirculated about the manifold, for a given reaction zone temperature.

The maximum allowable temperature will vary with the particular stock being processed. Thus, where the charge is a heavy gas oil cracking stock, which is substantially free from tar and asphaltic residue and boils substantially above 800° F., the temperature of the charge oil in the manifold should be maintained below about 700° F., and preferably about 500–650° F. For a similar stock containing a substantial amount of light gas oil, for example, about 50 percent gas oil boiling within the range 500–850° F., a temperature as high as 750° F. might be tolerated within the manifold. For a stock consisting almost entirely of gas oil boiling within the range about 450–850° F., a temperature as high as 850° F. in the liquid manifold might be satisfactory. On the other hand, where the charge stock is a crude residuum, the manifold temperature should be below 500° F. and frequently within the range 250–400° F.

Of course, even when the temperature is carefully controlled, some coke will form from the charge oil and slowly accumulate in the manifold, particularly in the feed orifices. It is therefore advisable to provide, in conjunction with this invention, means for burning out or reaming out coke from these orifices, as described and claimed in United States patent application Serial Number 633,623, filed January 11, 1957.

In this invention it is possible, in some cases, to use only one of nozzles 82 and obtain the required oil circulation, but the use of two or more of these nozzles, equally spaced, is preferable and usually required when the charge is entirely in the liquid phase. The larger the size and length of manifold pipe 80, the greater the number of jets 82 will be required to induce the needed circulation.

When a charge substantially entirely in the liquid phase is used, the velocity of the charge oil within the manifold passage just prior to the time it reaches one of the high velocity charge streams from nozzles 82, should be at least 1.5 feet per second, and preferably at least 3.0 feet per second. The maximum velocity at this point should be less than 15 feet per second, and preferably less than 10 feet per second. The velocity at this point is the minimum velocity in the manifold, so that it may be stated that the minimum velocity in the manifold should be within the range 1.5 to 15 feet per second, and preferably 3 to 10 feet per second.

When the charge is supplied to the manifold in a mixed phase, the minimum velocity of the charge around the manifold should be sufficient to keep the liquid material suspended in the vapor so that a uniform mixture of vapor and liquid will be ejected from each orifice. This velocity will be much higher than when a substantially entirely liquid charge is used and may range as high as 250 feet per second.

For any given apparatus of this invention, as the rate of total feed to the manifold increases, the amount of oil recirculating around the manifold increases but the ratio of the amount of charge supplied to any one of nozzles 82 to the charge recirculating will remain about constant. In the practice of this invention the volumetric ratio of hydrocarbon recirculated, measured at a point just upstream of any one of nozzles 82, to hydrocarbon charged through each of nozzles 82 should be greater than 0.5 to 1 but less than 9 to 1. Preferably, where the hydrocarbon charge is substantially entirely in the liquid phase, this ratio should be greater than 4 to 1 but less than 9 to 1, and when the charge is partially in the vapor phase, the ratio should be greater than 0.5 to 1 but less than 2 to 1.

The following table gives some of the operating data at varying charge rates for a liquid feed apparatus designed to operate according to this invention. A pipe ring made of 3-inch schedule 40 pipe and having a 6 foot, 6½ inch diameter was used. The ring had about 80 orifices of 0.125 inch diameter spaced on 3-inch centers through its underside. The data are for feeding a liquid at a temperature of 700° F. and having a density of 55 pounds per cubic foot and a viscosity of 0.75 centipoise to the ring. The nozzles used had a diameter of 0.500 inch at their discharge ends.

| Charge Rate | | No. of Nozzles | Rate of Recirculation of Oil, g.p.m. | Coefficient of Nozzle Perf., Percent | Initial Press. in Manifold Above Reactor Press. Required, p.s.i.g. | Minimum Oil Velocity in Ring, Ft./Sec. | Press. Drop Across Each Nozzle, p.s.i. | Approx. Total Press. Drop Across the Feed Apparatus, p.s.i. | Approximate Flow Per Orifice from the Ring | |
|---|---|---|---|---|---|---|---|---|---|---|
| Bbl./Day | g.p.m./Noz. | | | | | | | | Max. g.p.m. | Min. g.p.m. |
| 500 | 7.3 | 2 | 36.3 | 15 | 0.175 | 1.57 | 0.84 | 1.02 | 0.151 | 0.142 |
| 1,000 | 14.6 | 2 | 61.4 | 15 | 0.70 | 2.65 | 3.34 | 4.04 | 0.300 | 0.284 |
| 1,500 | 10.9 | 4 | 54.4 | 15 | 1.68 | 2.35 | 1.89 | 3.57 | 0.440 | 0.436 |
| 2,000 | 14.6 | 4 | 61.4 | 15 | 3.00 | 2.65 | 3.34 | 6.34 | 0.588 | 0.582 |
| 2,500 | 18.3 | 4 | 92.7 | 15 | 4.75 | 4.01 | 5.52 | 10.4 | 0.733 | 0.728 |
| 3,000 | 21.9 | 4 | 108.1 | 15 | 6.70 | 4.68 | 7.50 | 14.2 | 0.878 | 0.874 |
| 3,500 | 25.5 | 4 | 124.5 | 15 | 9.05 | 5.38 | 10.3 | 19.4 | 1.03 | 1.01 |
| 4,000 | 29.2 | 4 | 155.8 | 15 | 11.8 | 6.74 | 13.4 | 25.2 | 1.18 | 1.16 |
| 4,500 | 32.3 | 4 | 163.2 | 15 | 14.6 | 7.06 | 16.8 | 31.4 | 1.32 | 1.30 |

When the manifold is embedded in a moving contact material mass, it is preferable, as previously stated, that it be shaped with underside making an angle with the horizontal greater than the angle of repose of the contact material, that is, greater than about 30 degrees, normally. Preferably, this angle should be greater than about 40 degrees with the horizontal. This novel shape of manifold will have application to any process wherein a manifold is embedded in flowing contact material and is not limited to use with the particular liquid feed method of this invention. Likewise, when the method of this invention is used, it is not necessary to construct the manifold of this preferred shape.

The manifold need not necessarily be ring-shaped but may be square, hexagonal or other geometric shape which will provide a continuous passage for the flow of hydrocarbon charge.

A suitable design for feeding liquid charge to a catalytic conversion reactor is indicated in connection with the foregoing table. When used for mixed feed, a suitable design might be as follows:

The manifold ring consisted of a duct of rectangular cross-section having an outside diameter of 11 feet, 1 inch. The manifold was situated similar to the manifold of Figure 8. A single nozzle, having a slot-type outlet 7/16 of an inch high and extending across the manifold duct completely, was used. The duct was 1 foot, 1 inch across and varied in height from a maximum of 15 3/16 inches at a point 2 feet, 4 inches in front of the nozzle to a minimum of 9¾ inches at a point 1 foot, 7½ inches behind the nozzle. About 43 outlet pipes of 2.15 inches inside diameter extended from the manifold into the compact mass of contact material in the manner of Figure 8. This manifold was designed for 15,000 barrels per day of a gas oil charge which would be supplied with about 50 percent vaporized. The minimum velocity in the manifold duct was calculated to be about 55 feet per second. Recycle through the duct amounted to about 18,000 barrels per day.

This invention is intended to cover all changes and modifications of the examples of the invention, herein chosen for purposes of disclosure, which do not constitute departures from the spirit and scope of the invention.

I claim:

1. A method for supplying a hydrocarbon charge, substantially entirely in the liquid phase, to the reaction zone of a hydrocarbon conversion process and to a bed of solid contact material therein, said reaction zone being at a temperature sufficiently high to cause substantial pyrolytic conversion of the hydrocarbon charge, which comprises: continuously supplying the hydrocarbon charge at a temperature below that at which substantial pyrolytic conversion occurs to an annular-shaped manifold passage maintained within the reaction zone housing as at least one high velocity jet of hydrocarbon charge directed in a manner which will induce circulation of a stream of hydrocarbon charge around the continuous passage, causing a part of the hydrocarbon charge circulating in said continuous manifold passage to discharge from said manifold passage into the body of said reaction zone through a plurality of restricted passages from said manifold passage, which plurality of passages offer a substantial resistance to the flow of hydrocarbon charge, maintaining said jet of sufficient velocity and quantity that the volumetric ratio of liquid recycled around said passage to liquid discharged from said manifold passage is greater than 4 to 1 but less than 9 to 1 and causing the remainder of the hydrocarbon charge to be circulated around the passage and combined with said jet of hydrocarbon charge.

2. In a continuous hydrocarbon conversion process wherein the hydrocarbon charge is supplied to a confined reaction zone, at least partially in the liquid phase, and is passed through a bed of solid contact material maintained within a confined reaction zone to effect the desired conversion and wherein the reaction zone is maintained at a temperature substantially above the pyrolytic conversion temperature of the liquid hydrocarbons, the improved method for supplying the liquid charge to the reaction zone, which comprises: supplying the liquid hydrocarbon charge continuously as at least one high velocity stream of liquid to a confined annular-shaped liquid manifold passage maintained within the reaction zone, said high velocity stream being so directed as to induce circulation of a stream of hydrocarbon charge around the manifold passage, injecting a part of the liquid circulating in the manifold passage into the reaction zone by passage through a plurality of restricted passages and recycling the remainder of the liquid in the manifold passage back to be mixed with liquid in said high velocity stream, maintaining the volumetric ratio of the liquid recycled around the continuous passage to the liquid injected into the reaction zone less than 9 to 1 but greater than 4 to 1, and controlling the temperature of the liquid supplied to the manifold to a level substantially below the temperature at which substantial coke will form from the liquid.

3. The method of claim 2 further limited to supplying the liquid charge to the manifold passage as a plurality of high velocity streams directed to induce liquid circulation around the manifold passage and further limited to maintaining the minimum liquid velocity around the ring within the range about 1.5 to 15 feet per second.

4. In a continuous hydrocarbon conversion process wherein the hydrocarbon charge, supplied at least partially in the liquid phase, is passed downwardly through a moving mass of solid contact material maintained within a confined reaction zone at a temperature substantially above the pyrolytic conversion temperature of the liquid portion of the hydrocarbon charge, the improved method for supplying the liquid portion of the charge to the reaction zone, which comprises: supplying the liquid hydrocarbon charge continuously as a plurality of high velocity jets of liquid to a confined annular-shaped manifold passage embedded in said moving contact material mass and having a bottom which tapers down to a point a slope greater than the angle of repose of the granular contact material, whereby the moving contact material will act to scrub all of the exterior portions of said manifold passage free of coke accumulation, directing said high velocity jets so as to induce circulation of liquid charge around the manifold passage, injecting a part of the liquid circulating in the manifold passage into the contact material mass through a plurality of restricted passages and recirculating the remainder of the liquid around the manifold passage to be mixed with liquid entering through said jets, maintaining the minimum velocity of liquid circulating around said manifold passage within the range 3 to 10 feet per second and maintaining the volumetric ratio of the liquid recirculated around the passage to the liquid injected into the moving mass less than about 9 to 1 but greater than about 4 to 1, and controlling the temperature of the liquid supplied to the manifold to maintain the temperature of the charge within the manifold at a level substantially below the temperature at which coke will rapidly form from the liquid charge.

5. In a continuous hydrocarbon conversion process wherein the hydrocarbon charge is passed downwardly through a moving mass of solid contact material maintained within a confined reaction zone at a temperature substantially above the pyrolytic conversion temperature of the hydrocarbon charge, the improved method for supplying the hydrocarbon charge to the reaction zone, which comprises: maintaining a confined annular-shaped manifold passage within said reaction zone housing but exterior to said contact material mass, continuously supplying the hydrocarbon charge as at least one high velocity stream of mixed liquid and vapor so directed as to induce circulation around said manifold passage, passing a portion of the mixed phase charge from said manifold passage into said contact material mass through a plurality of flow-restricting passages, recirculating the remainder of the mixed phase charge around said manifold passage to be mixed with the mixed phase charge entering in said high velocity stream, maintaining the velocity and quantity of said stream such that the volumetric ratio of hydrocarbon recirculating within the manifold passage to liquid passing from said manifold passage into the contact material mass is greater than 0.5 to 1 but less than 2 to 1, and maintaining the velocity of said mixed phase charge within said manifold at a level sufficient to maintain the liquid portion of the charge suspended in the vapor portion.

6. An apparatus for the continuous conversion of a hydrocarbon charge, at least partially in the liquid phase, in the presence of a downwardly moving, substantially compact mass of granular contact material, which comprises in combination: an enclosed reaction vessel; at least one contact material supply conduit terminating within the upper section of said vessel so as to supply contact material to the upper surface of said mass; an enclosed annular-shaped hydrocarbon feed manifold passageway situated within said vessel at a level substantially below the lower end of said conduit, whereby said manifold will be embedded in said mass, said passageway having a downwardly tapered underside whose sides slope at an angle with the horizontal greater than 30 degrees; at least one nozzle for the supply of hydrocarbon charge of substantially less cross-sectional area than said passageway with outlet end situated within said passageway and directed tangentially down the center line of said passageway so as to induce circulation of the hydrocarbon charge around said passageway; means for supplying hydrocarbon charge at least partially in the liquid phase to said nozzle; a plurality of restricted passageways extending from the interior of said manifold passageway to the exterior thereof through the bottom of said manifold passageway, whereby a part of the liquid circulating in said manifold passageway will pass through said plurality of passageways into the reaction vessel while the remainder recirculates around the manifold passageway.

7. A method for supplying hydrocarbon charge to the reaction zone of a hydrocarbon conversion process and to a bed of said contact material therein, said reaction zone being at a temperature sufficient to cause substantial pyrolytic conversion of the hydrocarbon charge, which comprises: continuously supplying the hydrocarbon charge, at least partially in the liquid phase and at a temperature below that at which substantial pyrolytic conversion occurs, to an annular-shaped manifold passage maintained within the reaction zone housing as at least one high velocity jet of hydrocarbon charge directed in a manner which will induce circulation of the hydrocarbon charge around the continuous passage; causing a part of the hydrocarbon charge circulating in said continuous manifold passage to discharge from said manifold passage into the body of said reaction zone through a plurality of restricted passages from said manifold passage, which plurality of passages offer a substantial resistance to the flow of hydrocarbon charge; maintaining the velocity and quantity of said jet such that the volumetric ratio of the hydrocarbon charge recycled to said jet to the hydrocarbon charge supplied through said jet is greater than 0.5 to 1 but less than 9 to 1.

8. The process of claim 7 wherein the hydrocarbon charge is supplied to the manifold passage as a mixture of liquid and vapor and the volumetric ratio of liquid recycled to the jet to liquid supplied to the jet is greater than 0.5 to 1 but less than 2 to 1.

References Cited in the file of this patent

UNITED STATES PATENTS

| | | |
|---|---|---|
| 1,039,008 | Anderson | Sept. 17, 1912 |
| 1,756,805 | Baker | Apr. 28, 1930 |
| 1,943,146 | Rust | Feb. 14, 1933 |
| 2,432,344 | Sinclair | Dec. 9, 1947 |
| 2,438,261 | Utterback | Mar. 23, 1948 |
| 2,474,007 | Maycock | June 21, 1949 |
| 2,482,140 | Schutte | Sept. 20, 1949 |
| 2,518,304 | Goins | Aug. 8, 1950 |
| 2,548,286 | Bergstrom | Apr. 10, 1951 |
| 2,565,809 | Goins | Aug. 28, 1951 |
| 2,661,324 | Leffer | Dec. 1, 1953 |
| 2,683,109 | Norris | July 6, 1954 |